US006461654B1

(12) United States Patent
Cain et al.

(10) Patent No.: US 6,461,654 B1
(45) Date of Patent: Oct. 8, 2002

(54) BLENDS FOR BARRIER LAYERS FOR FOOD PRODUCTS

(75) Inventors: Frederick William Cain; Willem Dekker, both of Wormerveer (NL); Geoffrey Talbot, Purfleet; Kevin Warren Smith, Sharnbrook, both of (GB)

(73) Assignee: Unilever Patent Holdings BV (NL)

( * ) Notice: Subject to any disclaimer, the term of this patent is extended or adjusted under 35 U.S.C. 154(b) by 0 days.

(21) Appl. No.: 09/653,001

(22) Filed: Aug. 31, 2000

(30) Foreign Application Priority Data

Aug. 31, 1999 (EP) .............................................. 99306928

(51) Int. Cl.⁷ .............................................. A21D 15/08
(52) U.S. Cl. ........................... 426/94; 426/99; 426/293; 426/302
(58) Field of Search ............................ 426/94, 99, 98, 426/302, 293

(56) References Cited

U.S. PATENT DOCUMENTS

| 4,272,447 A | | 6/1981 | Beharry ...................... 260/425 |
| 4,871,558 A | * | 10/1989 | Tackikawa et al. ........... 426/99 |
| 5,126,151 A | * | 6/1992 | Bodor et al. .................. 426/99 |
| 5,130,150 A | * | 7/1992 | Averbach ...................... 426/99 |
| 5,130,151 A | | 7/1992 | Averbach ...................... 426/99 |
| 5,518,744 A | * | 5/1996 | Kaeser et al. ................. 426/90 |
| 5,660,865 A | | 8/1997 | Pedersen et al. .............. 426/99 |

FOREIGN PATENT DOCUMENTS

| EP | 0910955 A2 * | 4/1999 |
| WO | WO 98/42214 | 10/1998 |
| WO | WO 98/45390 | 10/1998 |
| WO | WO 00/69273 | 11/2000 |

OTHER PUBLICATIONS

Chemical Abstracts, vol. 80, No. 17, 1974, XP–002128753.
Poboran et al, "Utilization of Waxes and Sterol Condensate from the Refining of Sunflower Oil", Lucrari–de–Cercetare, Institul–de–Cercetari–si–Projectari–Alimentare, 12:35–46.
Kalistratova et, "Analysis of Sunflower Seed Waxes Using the Thermal Method", Izvestiya–Vysshikh–Uchebnykh–Zavedenii–Pishchevaya–Tekhnologiya; No. 5:141–143.

* cited by examiner

Primary Examiner—Lien Tran
(74) Attorney, Agent, or Firm—Morgan, Lewis & Bockius LLP

(57) ABSTRACT

Blends of a natural wax, such as sunflower wax and glyceride materials, substantially being triglycerides and having an N20>20 display excellent properties when applied in barrier layers for compound food products.

17 Claims, No Drawings

BLENDS FOR BARRIER LAYERS FOR FOOD PRODUCTS

BACKGROUND OF THE INVENTION

Food products that comprise more than one product layer are well known in the art. It is also known that, if the food product comprises layers, wherein at least one of the layers contains water so that the layers have a different water activity (Aw), these products often suffer from migration of the water from one layer to the other layer. Very often this migration has a negative impact on the performance of the food product, e.g. the product might suffer from sogginess, resulting in a product with insufficient appearance or texture. Therefore in these products a water barrier layer is very often used in order to decrease and if possible to avoid the water migration. A good water barrier layer should thereby fulfil the following criteria:

it should have a low water permeability.

it should stick well to the surfaces of the layers that it is supposed to protect against the water migration.

it should not be too brittle, so that the formation of cracks in this layer is avoided as much as possible.

it should have an appropriate viscosity at the temperature it is applied during the making of the food products, or else the processing becomes far too difficult.

the mechanical properties should be alright so that the layer can survive handling procedures, such as packaging without breaking.

the layer should not be noticeable during eating, otherwise the eating quality is affected in a negative sense.

the layer should not be apparent to the consumer.

So far most of the barrier layers present in commercial products are based on acetoglycerides. However these layers still have a considerable water permeability and are not always flexible enough and thus do not have the desired mechanical properties.

RELATED PRIOR ART

From U.S. Pat. No. 5,130,151 it is known that compositions useful as moisture barrier for a food product can consist of edible oleaginous material with a melting point above ambient temperature and a portion of a material selected from sucro poly fatty esters and sugar alcohol polyol polyesters and a wax. The waxes mentioned do not include sunflower wax, while according to this document always a polyester must be present in the composition.

In our earlier patent application EP 910 955 (published April 1999) we disclose blends of wax esters and triglycerides as fat replacer. The wax esters consist of at least two different wax esters from which at least one has a melting point of 20 to 60° C., while the mix of wax esters has a melting point of 15 to 45° C. The triglycerides that can be present can be selected from the group of: liquid oils, fractions of hardened liquid oils, hardened liquid oils, cocoa butter, cocoa butter equivalents, palm oil, fractions thereof, fish oil, fish oil fractions, hardened fish oil or fractions thereof, enzymically made equivalents of above fats and mixtures of one or more of these fats. In example 2 of this document a wax is prepared from behenyl alcohol and the fatty acids of sunflower oil. However this product has a composition that is different from sunflower wax.

BRIEF SUMMARY OF THE INVENTION

We performed a study to find out whether we could find new compositions that could be used as water barrier layers in food products without the problems indicated above.

This study resulted in the finding of novel blends of edible organic materials, comprising a natural wax and glyceride materials, wherein the natural wax is a wax derived from sunflower oil and the glycerides substantially are triglycerides with a solid fat content at 20° C. (N20) as measured by unstabilised NMR techniques, of at least 20, preferably at least 40, most preferably 50–95 and wherein the wax is present in the blend in an amount of 1–80 wt %, preferably 2.5–60 wt %, most preferably 5–40 wt %. The N-value mentioned here is measured by NMR techniques on a fat that has not been stabilised i.e. the fat has been subjected to the following pretreatment:

melting at 80° C., cool it to 0° C. and hold at 0° C. for 60 minutes, then heat to measurement temperature (here 20° C.) and hold at 20° C. for 30 min before measuring the N-value.

PREFERRED EMBODIMENTS OF THE INVENTION

Preferred blends are blends of 1. a wax of sunflower oil, obtained by cooling of sunflower oil to 0–20° C., holding the cooled oil for 12–48 hours, removal of the wax by filtration and refiltration of the wax at 30–70° C. and
2. other glyceride components.

Most preferred blends are blends wherein the wax is obtained after a further purification process involving at least one of the following procedures:

1. melting, cooling to 50–70° C. and filtration or
2. dissolution in a solvent, such as acetone or hexane, cooling to 20–60° C. and filtration, recovering the wax as a solid.

The glyceride component present in these blends can be selected from a wide range of fats and oils. Preferably the glyceride component is selected from the group consisting of: liquid oils, partially or fully hardened liquid oils, fractions thereof, palm oil, or fractions thereof, shea oil or fractions thereof, cocoa butter or fractions thereof, sal or fractions thereof and mixtures of these oils.

The wax component in our blends often is obtained as a mixture with an oil from which it is isolated, as the triglycerides are often difficult to be removed completely. We prefer to use blends wherein the glyceride component at least partially is a liquid oil component as present in the sunflower wax as obtained by the process set out above.

In many instances it is preferred to add a filler material to the barrier layer, eg to decrease its caloric content or to improve the textural or other properties of the layer. Therefore we prefer to use blends of organic materials and a filler material wherein the blend comprises 90–10 wt % of a filler material and 10–90 wt % of the blend according to the invention. Typically the filler material is selected from the group consisting of 1. carbohydrates, in particular sugars,
2. thickeners, in particular cellulose powders or fibres, starches and modified starches,
3. emulsifiers, in particular mono- and diglycerides and lecithins,
4. powders, in particular dairy powders selected from butter milk powder, milk powder and skimmed milk powder and cocoa powder.

Part of the invention are also food products in particular multi-layered or compounded food products comprising at least one barrier layer, separating two layers with different water activity and wherein the barrier layer comprises a blend with the composition according to the invention.

These food products beneficially comprise at least three phases A, B and C,

A being a baked flour based system

B being the barrier layer according to the invention

C being a water based food composition and wherein the layers A and C have a water activity Aw such that the difference $\{(AW)_A-(Aw)_c\}_{abs}$ hereof is at least 0.1, preferably at least 0.3.

Herein layer C preferably is selected from the group consisting of fat emulsions (water or fat continuous), creams, custards, jellies, ice cream, sauces, fruit, vegetables and jam.

In another type of food product the migration might take place via the air surrounding a mixture of small entities of the components of the food product. Examples hereof are blends of dried fruit and a cereal, such as corn flake or wheat flakes, which blend is provided with a barrier layer, wherein the barrier layer comprises a blend according to the invention.

A last embodiment of the invention is the use of a blend of edible organic materials as a barrier layer in food products wherein a barrier layer comprising the blend according to the invention is applied to prevent moisture migration in the food product and to improve the texture of the food products according to the invention.

EXAMPLES

Example 1

A number of pastry cups were filled with the following barriers:

a hydrogenated vegetable fat (=fat A) having the following fatty acid composition:
C16:0=27%
C18:0=13%
C18:1=60%

Sunflower oil=fat B

Sunflower wax=fat C

A blend of 90/5/5 Fat A/Fat B/Fat C=fat D

Fat A was obtained as a sample from Loders Croklaan

Fat B was a commercially available sunflower oil

Fat C was obtained as a sample from Unilever

Fat D was obtained by simply blending fats A, B and C in ratio's indicated.

The barriers were applied on the surface of the pastry cup by using a brush. With fat A and B this could be done easily at 45° C. With fat D this was done at 90° C. With fat C we could not get a good adherence to the surface, this material was also too brittle.

The cups were stored at 7° C. after being filled with custard for resp 24 and 48 hrs respectively. After this time the texture of the pastry cups was determined by breaking manually at least 5 of the cups. For the evaluation the results were listed on a scale of 1–5, 1 being very soggy, no resistance against breaking 5 being crispy, showing some snap, high resistance against breaking.

From the results it can be concluded that the blend demonstrated an unexpected and unpredictable (synergistic) improvement in texture compared with its components per se. The viscosity of the blend (fat D) was unexpectedly similar to the viscosity of main component A, although containing the higher viscosity fat C.

Results are summarized in the table:

|  | TEXTURE | |
| --- | --- | --- |
|  | After 24 hrs | After 48 hrs |
| Fat A | 2.0 | 1.5 |
| Fat B | 1.0 | <1.0 |
| Fat C | 2.0 | 1.5 |
| Fat D | 3.5 | 2.0 |

Also the viscosity of the fats were measured at 85° C. The results being:

|  | Viscosity |
| --- | --- |
| Fat A | 17.0 mPa.s |
| Fat B | 12.3 |
| Fat C | 24.7 |
| Fat D | 16.8 |

Example 2

Crude sunflower stearine (wax) was obtained from Van den Bergh, Inveruno, Italy. It was analysed by high pressure liquid chromatography on silica and found to contain 5.8% wax esters. This was further concentrated by heating the oil to 35° C. and pressing at 200 bar for 6 hours. The resultant concentrated wax from the solid cake was analysed to contain 53.4% wax. This was added to a partially hydrogenated vegetable oil at a level of 10% to give a blend containing approximately 5% wax (along with 5% residual sunflower oil)—Blend 1. The wax concentrate was similarly added to non-hydrogenated vegetable oil—Blend 2. The solid fat content at 20° C. (N20) of non-hydrogenated palm olein, determined using pulse NMR following cooling of the fully melted fat to 0° C. for 1 hour then holding at 20° C. for 30 minutes, was 20.9%. The N20 of the partially hydrogenated vegetable oil was 61.1%. Carnauba wax and candellila wax (both from Sigma-Aldrich Company Ltd., Dorset, UK) were each added to partially hydrogenated vegetable oil at a level of 5% to give blends containing 5% wax (Blends 3 and 4 respectively). Candellila wax was also added to partially hydrogenated vegetable oil at a level of 10% (Blend 5). As controls, partially hydrogenated vegetable oil alone and with 5% sunflower oil were used (Blends 6 and 7 respectively). Each of these blends was painted onto 9 pieces of card (Cartoncote from Iggesund Paperboard, Workington, UK). The permeability of each of these coated cards was determined using the Versaperm WVTR Meter (Cheel Scientific, UK) at an RH gradient of 100%. Uncoated card gave a reading too high for the instrument to measure thus permeability values related to the lipid barrier applied. The data is summarised in the following table.

| Sample | Permeability g.mil/(m².d.mmHg) |
| --- | --- |
| Blend 1 | 0.92 |
| Blend 2 | 3.10 |
| Blend 3 | 2.86 |
| Blend 4 | 1.89 |
| Blend 5 | 1.27 |

| Sample | Permeability g.mil/(m².d.mmHg) |
|---|---|
| Blend 6 | 4.24 |
| Blend 7 | 5.04 |

Comparison of Blends 6 and 7 show that addition of just 5% sunflower oil increases the moisture permeability of partially hydrogenated vegetable oil. Comparison of Blend 1 with Blend 6 shows that addition of 5% sunflower wax (even in the presence of 5% sunflower oil) reduces the permeability more than do the other vegetable waxes (compare Blends 3 and 4 with Blend 6). Even increasing the level of candellila wax to 10% (Blend 5) does not reduce the permeability to that with 5% sunflower wax (Blend 6). Comparison of Blends 1 and 2 shows that a high N20 (i.e.>40%) is necessary for low permeability.

Example 3

Crude sunflower stearine was obtained from Van den Bergh, Inveruno, Italy. It was analysed by high pressure liquid chromatography on silica and found to contain 5.9% wax. This was hydrogenated using a catalyst to remove polyunsaturated fatty acids and to form the trans isomer, thus increasing the melting point of the oil (Blend 8). For comparison, sunflower oil was also hydrogenated by the same process (Blend 9). The N20 of Blend 8 was 63.3% and that of Blend 9 was 71.5% showing that the N20 of the triacylglycerol (fat) part of the Blend 8 was greater than 40%. The moisture permeabilities of these two fats were determined as in Example 2. The results are summarised below.

| Sample | Permeability g.mil/(m².d.mmHg) |
|---|---|
| Blend 8 | 1.09 |
| Blend 9 | 4.44 |

The data show that using sunflower stearine, with 6% wax, as the starting point for hydrogenation yields much lower moisture permeabilities.

Example 4

Partially hydrogenated vegetable oil was blended with 10% concentrated wax (~50% wax) as prepared in Example 2 (Blend 10). Individual shortbread pastry dessert bases (Hoppers Farmhouse Bakery, Herne Bay, UK) were coated with Blend 10 by using a brush to 'paint' the interior of the pastry base with fully molten lipid. Eight bases were coated and eight bases were left uncoated. After the lipid had solidified, the bases were filled with confectioner's custard (Baktotaal BV, Nijmegen, The Netherlands) and stored in an enclosed box at 7° C. After 24 and 48 hours, four bases from each group were removed. The texture of the pastry was assessed by a panel manually breaking the bases after removal of the custard and assigning a score from 1 to 5, where 1 is soft and soggy and 5 is crisp and brittle. The results are summarised below.

| Sample | Texture, 24 hours | Texture, 48 hours |
|---|---|---|
| No barrier | 1.0 | 1.0 |
| Blend 10 | 4.0 | 2.0–3.0 |

Blend 10 reduced the loss of crispness in the pastry considerably. The texture was better after 48 hours than the control system with no barrier after 24 hours.

Example 5

Petri dishes were filled with molten paraffin wax (Sigma-Aldrich Company Ltd., Dorset, UK) into which were embedded shortbread pastry cases (Safeway PLC, UK), leaving the upper surface exposed. This ensured that the principal route for moisture migration was through the exposed upper surface of the pastry. Hydrogenated sunflower stearine, as prepared in example 3. (Blend 8) was compared to partially hydrogenated vegetable oil (Blend 11) and to an uncoated pastry case. A brush was used to apply the molten barrier material to the pastry. After the lipid barrier had solidified, the bases were weighed, filled with confectioner's custard (Baktotaal BV, Nijmegen, The Netherlands) and stored in an cabinet at 6° C. After 24 and 8 hours, samples from each group were removed, the custard peeled out and the bases weighed. The increase in weight due to the uptake of moisture is summarised in the table below. Samples were prepared in duplicate.

| Sample | Weight Increase (g) 24 hours | Weight Increase (g) 48 hours |
|---|---|---|
| No barrier | 8.4 | |
| Blend 11 | 3.0 | 4.9 |
| Blend 8 | 1.0 | 2.0 |

Moisture uptake was considerably reduced when Blend 8 was used, being less after 48 hours than Blend 11 after 24 hours.

Example 6

Experiments were performed by the same arrangement as example 5. Partially hydrogenated vegetable oil (Blend 11) was compared with the same oil combined with 10% concentrated wax (Blend 12) as prepared in Example 2. The increase in weight due to the uptake of moisture is summarised in the table below. Samples were prepared in duplicate.

| Sample | Weight Increase (g) 24 hours | Weight Increase (g) 48 hours |
|---|---|---|
| Blend 11 | 3.8 | 4.4 |
| Blend 12 | 1.2 | 2.5 |

Moisture uptake was considerably reduced when Blend 12 was used.

What is claimed is:

1. A blend of edible organic materials, comprising a natural wax and partially hardened glyceride materials, wherein the natural wax is a wax derived from sunflower oil and the partially hardened glycerides substantially are triglycerides with a solid fat content at 20° C. (N20) as measured by unstabilized NMR techniques of at least 40, and wherein the wax is present in the blend in an amount of 1–80 wt %.

2. Blend according to claim 1, wherein the blend is a blend of (1) a wax of sunflower oil, obtained by cooling sunflower oil to 0–20° C., holding the cooled oil for 12–48 hours, removing the wax by filtration and refiltration of the wax at 30–70° C. and (2) other glyceride components.

3. Blend according to claim 2, wherein the wax, obtained as described in (1), is subjected to a further purification process involving at least one of the following procedures: (1) melting the wax, cooling the same to 50–70° C. and filtration or (2) dissolution of the wax in a solvent, cooling to 20–60° C. and filtration, and recovering the wax as a solid.

4. Blend according to claim 1, wherein the glyceride component is selected from the group consisting of: liquid oils, partially or fully hardened liquid oils, fractions thereof, palm oil, or fractions thereof, shea oil or fractions thereof, cocoa butter or fractions thereof, and mixtures of these oils.

5. Blend according to claim 1, wherein the glyceride component at least partially is a liquid oil component as present in the sunflower wax as obtained by cooling sunflower oil to 0–20° C., holding the cooled oil for 12–48 hours, removing the wax by filtration and refiltration of the wax at 30–70° C.

6. Blend of organic materials and a filler material wherein the blend comprises 90–10 wt % of a filler material and 10–90 wt % of the blend according to claim 1.

7. Blend according to claim 6, wherein the filler material is selected from the group consisting of carbohydrates, thickeners, starches and modified starches, emulsifiers and dairy powders selected from butter milk powder, milk powder, skimmed milk powder and cocoa powder.

8. A multi-layered food product comprising at least one barrier layer, separating two layers with different water activity and wherein the barrier layer comprises a blend with the composition of claim 1.

9. A multi-layered food product according to claim 8, wherein the food product comprises at least three phases A, B and C, A being a baked flour-based system, B being the barrier layer, and C being a water-based food composition, and wherein the layers A and C have a water activity Aw such that the difference $(Aw)_A - (Aw)_C\}_{abs}$ hereof is at least 0.1.

10. A multi-layered food product according to claim 8, wherein the baked flour-based system A is selected from the group consisting of biscuits, cakes, crackers, cookies, bread, wafers, pizza bases and pastries.

11. A multi-layered food product according to claim 8, wherein the water-based food composition C is selected from the group consisting of fat emulsions, creams, custards, jellies, ice cream, sauces, fruit, vegetables and jam.

12. A food product comprising a blend of dried fruit and a cereal, said blend being provided with a barrier layer, wherein the barrier layer comprises a blend according to claim 1.

13. A food product including a blend of edible organic materials as a barrier layer wherein the barrier layer comprises a blend as defined in claim 1 to prevent moisture migration in the food product and to improve the texture of said food product.

14. A blend according to claim 1 wherein the triglycerides have an N20 in the range of 50–95.

15. A blend according to claim 14 wherein the wax is present in an amount of 25–60 wt % of the blend.

16. A blend according to claim 7 wherein the carbohydrates are sugars, the thickeners are cellulose powders or fibers, starches or modified starches, and the emulsifiers are mono- and di-glycerides or lecithin.

17. A multi-layered food product according to claim 9 wherein the difference $(Aw)_A - (Aw)_C\}_{abs}$ is at least 0.3.

* * * * *